United States Patent [19]
Frick

[11] Patent Number: 5,982,410
[45] Date of Patent: Nov. 9, 1999

[54] METHOD AND APPARATUS FOR RECORDING PICTURE INFORMATION USING A PHOTOGRAPHIC SINGLE SHEET PRINTER

[75] Inventor: Beat Frick, Buchs, Switzerland

[73] Assignee: Gretag Imaging Ag, Regensdorf, Switzerland

[21] Appl. No.: 09/054,535

[22] Filed: Apr. 3, 1998

[30] Foreign Application Priority Data

Apr. 7, 1997 [EP] European Pat. Off. ............ 97 105 703

[51] Int. Cl.⁶ ..................................................... B41J 11/00
[52] U.S. Cl. ........................... 347/264; 347/262; 347/218
[58] Field of Search ..................................... 247/218, 171, 247/181, 182, 186, 240, 250, 262, 264; 358/447, 448, 456

[56] References Cited

U.S. PATENT DOCUMENTS

| | | | |
|---|---|---|---|
| 4,698,648 | 10/1987 | Takahashi et al. | 347/262 |
| 4,912,565 | 3/1990 | Yokota et al. | 358/447 |
| 5,323,181 | 6/1994 | Ohtani et al. | 347/218 |
| 5,367,384 | 11/1994 | Samakato | 358/456 |
| 5,532,731 | 7/1996 | Mihara et al. | 347/250 |

FOREIGN PATENT DOCUMENTS

| | | | |
|---|---|---|---|
| 0 244490 A1 | 11/1987 | European Pat. Off. | H04N 1/04 |
| 2085580 | 4/1982 | United Kingdom | G01B 11/00 |

Primary Examiner—N. Le
Assistant Examiner—Hai C. Pham
Attorney, Agent, or Firm—Burns, Doane, Swecker & Mathis, LLP

[57] ABSTRACT

An improved method and apparatus to record picture information on recording material in the form of single sheets. The picture information to be recorded for each sheet is present in electronically stored pixel form and is recorded pixel by pixel onto the recording material. The sheets of the recording material are transported through a paper stage of a printer in at least two adjacent tracks, and the stored picture information belonging to the respective sheets located in the recording station is recorded onto the sheets located in the adjacent tracks. Because the sheets are transported in a plurality of tracks through the recording station, a higher throughput can be attained even if smaller sheet sizes are being processed.

16 Claims, 4 Drawing Sheets

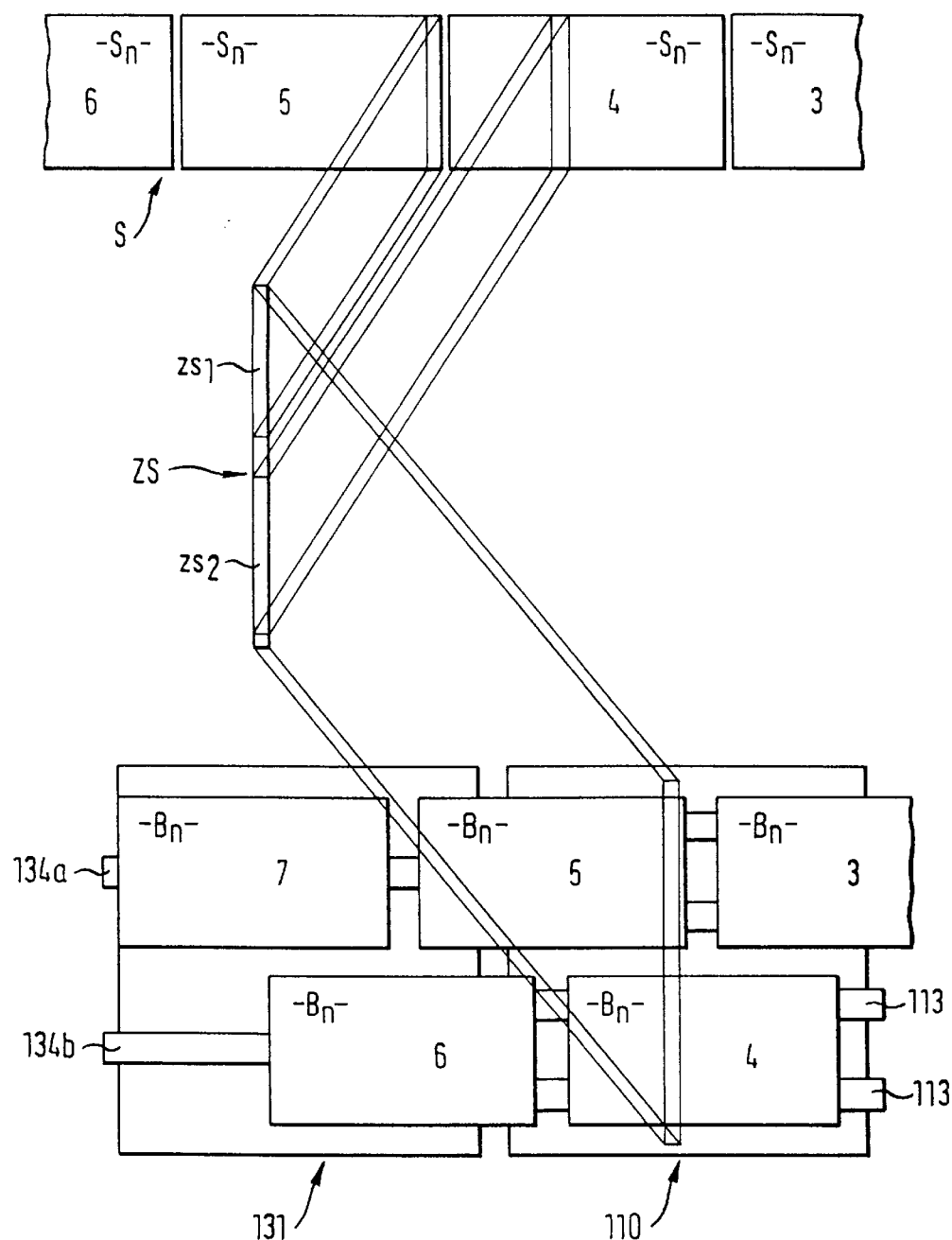

METHOD AND APPARATUS FOR RECORDING PICTURE INFORMATION USING A PHOTOGRAPHIC SINGLE SHEET PRINTER

This application claims priority under 35 U.S.C. §§119 and/or 365 to 97105703.9 filed in Europe on Apr. 7, 1997; the entire content of which is hereby incorporated by reference.

BACKGROUND OF THE INVENTION

1. Field of the Invention

This invention relates to a method and apparatus for recording picture information onto recording material in the form of single sheets. More specifically, the invention produces photographic copies using a medium-capacity photographic singlesheet printer, of the kind typically employed in combined copier and developer equipment (e.g., minilabs).

2. State of the Art

In typical single-sheet printers, sheets of copy material of a desired size are fed sequentially into an exposure station of a printer. The sheets are exposed to light to form a picture in a pixel-by-pixel fashion. Exposure is performed, for example, by a cathode ray tube or a laser exposure device and delivered to a paper processor downstream of the printer. The exposure station of the printer is normally adapted to the largest size of copy material sheets (e.g., approximately 300 mm×450 mm). Experience teaches, however, that the larger sizes are not needed as often as the standard sized sheets (e.g., 100 mm×150 mm). This means that the printer operates at a far lower throughput than it is designed for. Throughput is the total surface area of all the sheets of copy material exposed per reference unit of time. For example, a typical minilab with a line exposure unit and an exposure width of 300 mm, which is required for the large picture sizes of 300 mm×450 mm, attains a linear speed of about 25 mm per second. If standard-sized prints (100 mm x 150 mm) are exposed longitudinally, then one print takes six seconds, which is equivalent to an output of 600 prints per hour. This comparatively low output resulting from the large exposure width is not economical for such a relatively expensive device. Normally, a printer should be able to output 1800 or more prints per hour.

In a printer with a line exposure unit, the throughput for smaller sizes could, theoretically, be increased by increasing the scanning speed and at the same time adapting the paper speed. But this could be done only in discrete steps, and would necessitate mechanical reverses at the polygonal mirror, would require substantially greater precision, and would not allow for fast changes. Hence, there is no thought of employing this arrangement in actual practice.

The problem discussed above in terms of a single-sheet printer, such as a minilab, logically exists in other recording apparatuses as well, such as printers of most of the various technologies that are designed for sheet-like recording material of varying sizes and that cannot attain their full output at relatively small sheet sizes.

SUMMARY OF THE INVENTION

An object of the present invention is to provide an improved method and apparatus for recording generic picture information by increasing the throughput even with the processing of smaller sheet sizes.

In accordance with an object of the invention, sheets of the recording material are guided through a recording station in two or more parallel transport tracks. Delivering them in a plurality of transport tracks has the advantage that for smaller sheet sizes, a plurality of sheets can be fed in a side-by-side manner and written upon substantially simultaneously. In other words, the sheets can be processed based upon the appropriate picture information substantially simultaneously. Larger sheet sizes occupy two or more transport tracks. If the single sheets of the same or different size are skillfully arranged, then the unoccupied intermediate spaces next to and between successive sheets can be minimized. The occupation density within the recording station (i.e., the ratio of surface area actually occupied by the sheets to the maximum of available surface area) is higher than in conventional methods and the throughput is correspondingly higher.

Where exemplary embodiments are employed in the printer of a minilab, single sheets are exposed and guided in a plurality of parallel tracks to a paper processor. Here it is unnecessary to distribute the exposed sheets crosswise downstream of the printer.

BRIEF DESCRIPTION OF THE DRAWINGS

The present invention can be further understood with reference to the following description and appended drawings in which like reference numerals refer to like elements, and where:

FIG. 4 is a schematic sketch for illustrating the organization and readout of the picture information data according to an exemplary embodiment of the present invention.

DESCRIPTION OF THE PREFERRED EMBODIMENT

Figure 1:
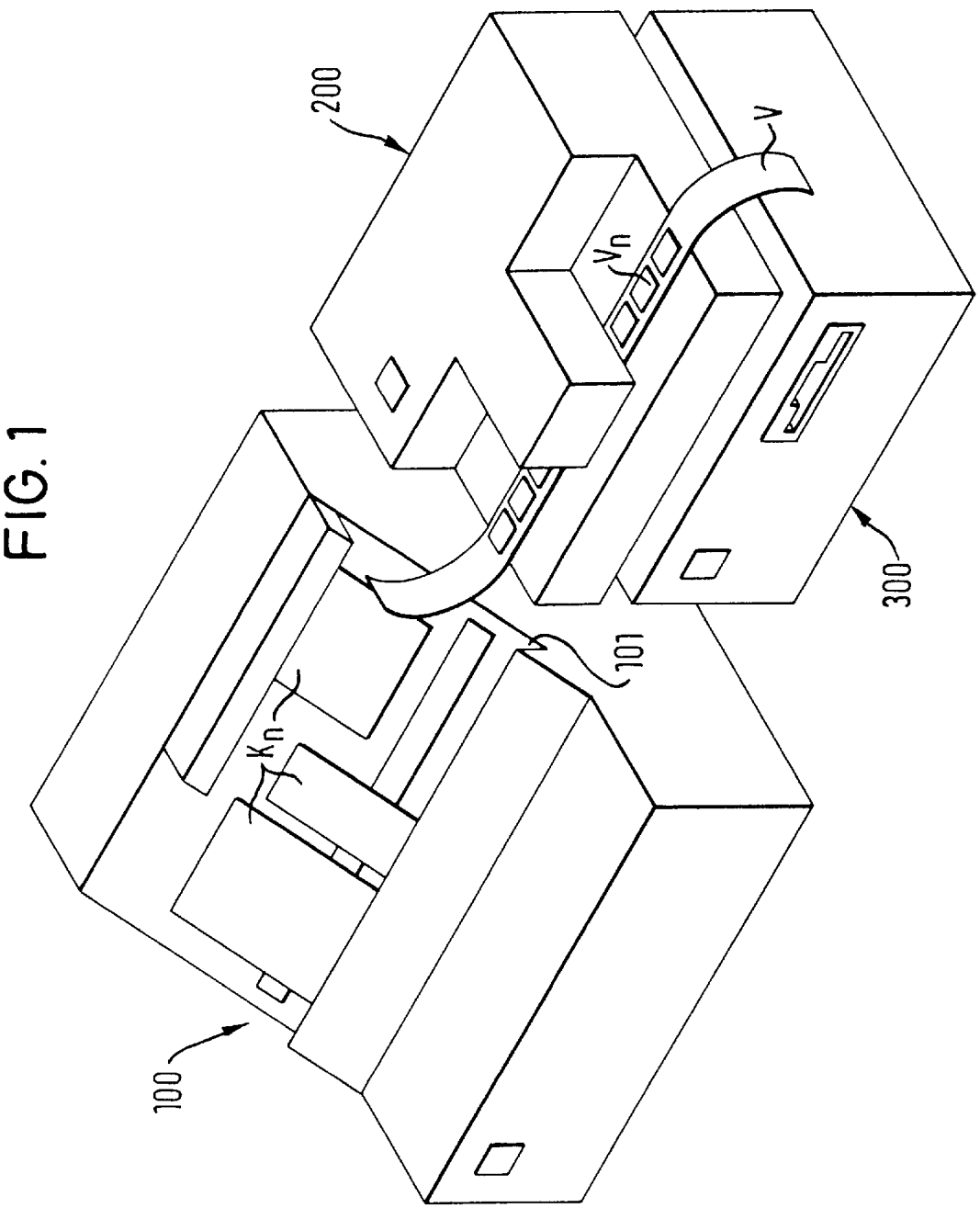
FIG. 1 illustrates a schematic overall view of a minilab device.

The digital minilab shown generally in FIG. 1 includes a printer and paper processor unit 100, an original scanner 200, and a computer 300 that is connected to and controls both the printer and paper processor unit 100 and the scanner 200. The scanner 200 photoelectrically scans individual images, $V_a$, of an original strip, V, in a pixel-by-pixel manner in the three color channels; red, blue and green. This scanning data is then stored in memory of the computer 300. Based upon the scanning data (i.e., picture information), the computer is able to calculate appropriate exposure data for the printer in the printer and paper processor unit 100. The exposure data is then stored in a picture information memory, S, in the computer 300. This enables prints, $B_n$, to be from the individual images, $V_n$. Normally, the exposure data stored in memory, S, includes, for each individual pixel of the print to be made, a set of three exposure values for the colors red, blue and green which is a digital representation of the picture contents of the prints to be made.

Exposure data stored in the picture information memory S is a linear lineup of the data belonging to the various original images, $V_n$. For each print, $B_n$, to be made, a matrix-like memory region, $S_n$, that includes three planes is provided within the picture information memory. The memory region also has dimensions comprising the number of longitudinal pixels and the number of crosswise pixels for the print to be made. Each element in the matrix corresponds to one pixel of the print to be made and located in each of its three planes are the three color exposure values for the applicable pixel. In monochromatic pictures, the matrix needs to have only one plane. The scanner 200 and the picture information memory S are, to this extent, equivalent to the prior art and, require no further explanation here.

The printer and paper processor unit 100 includes a photographic printer and a paper processor downstream of the printer. Both the printer and paper processor are able to process single sheets of copy material. The printer, equipped with a line exposure unit, shown in FIG. 2, receives the exposure data, contained in the picture information memory S, from the computer 300 and exposes single sheets of photographic copy material delivered to it in an image-by-image manner. The exposed single sheets are then guided through the paper processor in a plurality of parallel tracks and subjected to a wet-chemical treatment. As shown in FIG. 1, the fully developed paper copies $K_n$ leave the paper processor in the order in which they were fed into the printer at the front side of the unit 100 and slide into a collecting groove 101, where they are pushed together into a sorted stack.

The printer and paper processor unit 100 in this general nature is likewise fully equivalent in structure and function to the prior art, so that further explanation is unnecessary for one skilled in the art. The distinctions according to exemplary embodiments of the invention discussed below, reside in the specialized embodiment of the printer and in the manner in which the exposure data is recorded and supplied to onto the sheets of copy material.

Figure 2:
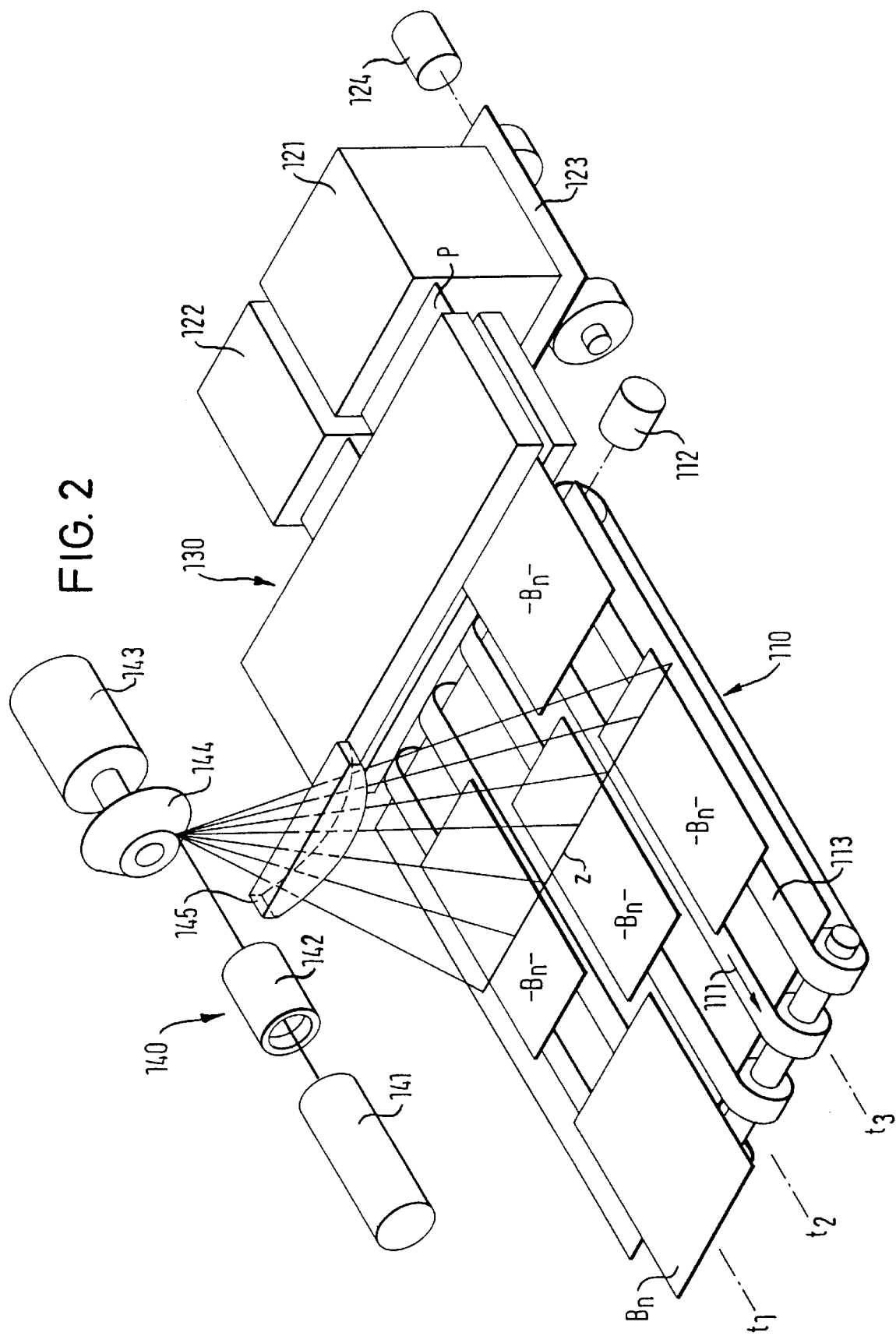
FIG. 2 illustrates schematically components of the printer of the minilab according to an exemplary embodiment of the invention.

The components of the printer which are necessary for understanding an exemplary embodiment of the invention are shown in FIG. 2. The printer includes a recording station having a paper stage 110 with a number of conveyor belts 113, driven in parallel and in a synchronized fashion in the direction of the arrow, 111, by means of a motor, 112. The printer also includes two paper cassettes 121 and 122, with supply rolls of various widths of copy paper, a discharge buffer unit, 130, and a recording device, shown in FIG. 2 as an exposure unit 140 disposed above the paper stage. The two paper cassettes 121 and 122 are adjustably positioned on a carrier, 123, and are adjustable crosswise to the direction of motion of the conveyor belts 113 and the paper stage, 110. The drive motor 124 performs the crosswise adjustment to the carrier 124.

Figure 3:
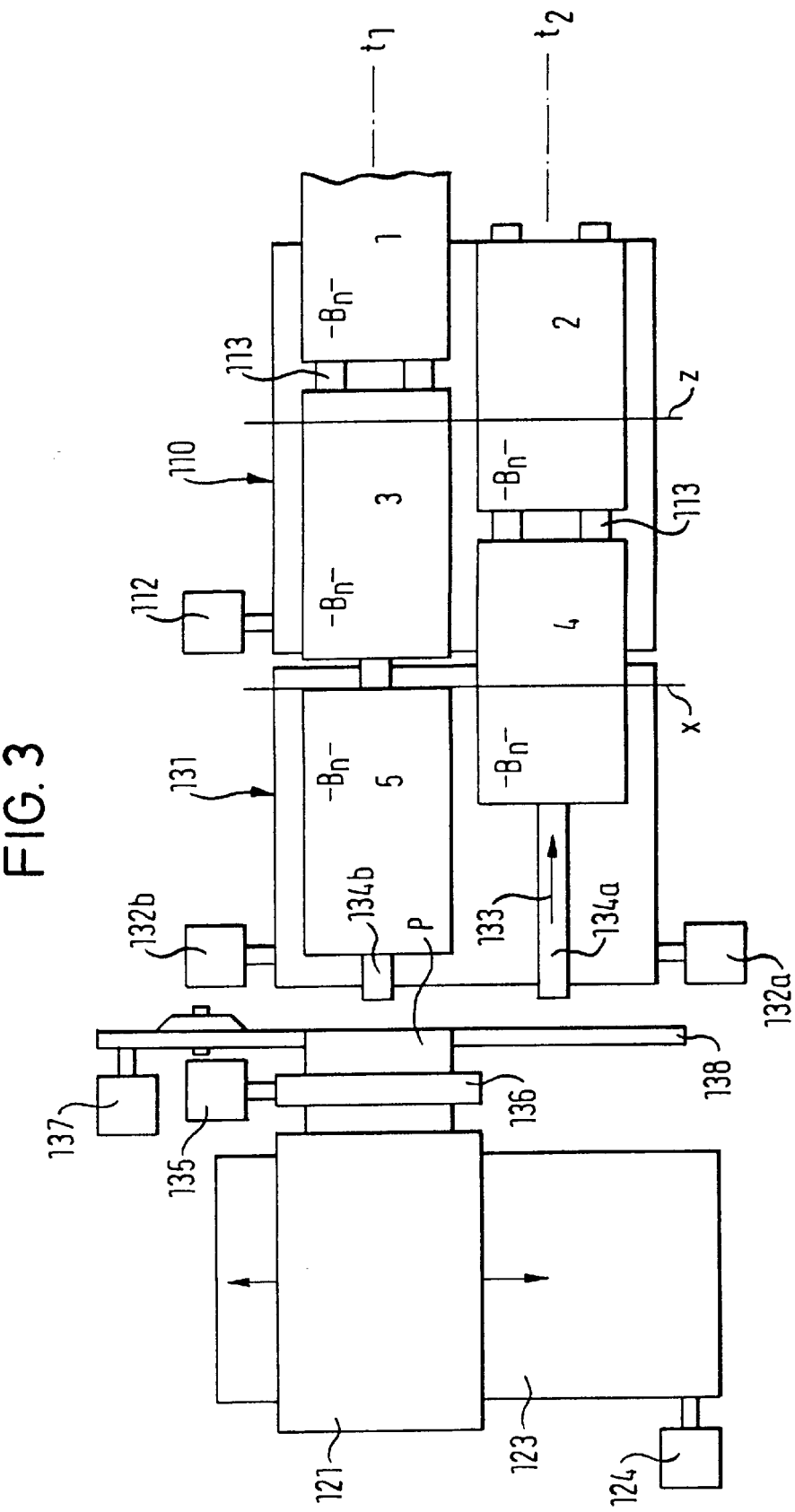
FIG. 3 illustrates a schematic sketch showing the paper travel in the printer according to an exemplary embodiment of the invention.

The discharge buffer unit, 130, as shown in more detail in FIG. 3, includes a buffer stage 131, which precedes the paper stage 110 and has conveyor belts 134a and 134b driven by two independent motors 132a and 132b in the direction of arrow 133. Two pairs of discharge rollers 136 are used in the discharge buffer unit 130. For the purpose of simplicity, FIG. 3 shows only one pair of discharge rollers and one paper cassette. Each pair of discharge rollers assigned to a respective paper cassette 121 and 122 is adjustable crosswise with respect to paper cassettes 121 and 122, and are driven by one motor 135, per pair of rollers. One paper cutter 138, driven by a motor 137 or a lifting magnet, extends over the entire width of the paper stage 110.

In the exemplary embodiment shown, a line exposure unit 140 of the recording station is used as the recording device and is equipped with three colored lasers as light sources. It is understood, however, that any other line exposure unit which is capable of performing line-by-line or strip-by-strip exposure can be employed. A cathode ray tube exposure unit is one such example. As will be described in further detail below, the recording of the invention may also be done using other technologies such as an ink jet printer.

The line exposure unit 140, as shown in FIG. 2, includes three laser light sources 141 for the three colors; blue, red and green, and includes three acousto-optical modulators 142 for the three laser laser light sources. In FIG. 2, for the sake of simplicity, only one laser light source and one modulator are each shown. Also shown is one rotating polygonal mirror 144 driven by a motor 143 and an F-theta lens 145. By means of the rotating polygonal mirror 144, the impact point of the three laser beams on the paper stage, or on the sheet material located on it, is scanned crosswise over the entire exposure width of the paper stage. The laser beam (i.e., the three united colored laser beams), shown in FIG. 2, from the polygonal mirror to the copy paper is shown at various times in the course of a scan. The local exposure of the copy material and, thus the resultant optical density on the copy paper that is visible after development, is controlled via the modulation over time of the three laser beams by the three modulators 142. The three modulators 142 are each triggered by one analog color-component picture signal, which by digital/analog conversion is generated from the digital exposure data in the picture information memory, S, of the computer 300. In each scan, the line exposure unit 140 records a single picture line "z", whose length is equivalent to the maximum exposure width of the paper stage 110 and whose width is equivalent to the dimension of one pixel in the longitudinal direction (i.e., paper transport direction). The second dimension of the picture to be recorded is attained by the advancement of the sheets of copy material. For a picture of satisfactory quality, typically a resolution of 200 to 300 dpi (dots per inch or pixels per inch) is needed, which for a maximum exposure width of 300 mm is equivalent to 2400 to 3600 pixels per picture line "z". The linear dimension of a typical, substantially circular pixel is thus around 0.085 to 0.13 mm. From this point, the design, triggering and mode of operation of the line exposure unit 140 is known and, therefore, requires no further explanation.

All the components of the printer, and the line exposure unit (e.g., drive motors, etc.) are connected to and controlled by the computer 300. The connecting lines to the computer are not shown, for the sake of simplicity. Naturally, the printer or printer and paper processor unit 100 as a whole may also be provided with its own control computer. In that case, there would be a data interface, in which the printer would be supplied with the picture information stored in memory in the computer 300, or another data source.

One advantageous characteristic of the invention is, as shown in FIGS. 2–4, that the single sheets $B_n$, of photo material, P to be written upon (i.e., exposed) with picture information are not guided through the printer (i.e., recording station) in succession in a single movement track. Instead, the single sheets are each distributed over two or more adjacent transport tracks, depending on the sheet size. For smaller sheet sizes, two or more sheets, with an offset in the longitudinal direction, come to rest next to one another and are each partially written upon by the beam of light in the same scan. In FIG. 2, three such transport tracks $t_1$, $t_2$ and $t_3$ can be seen. In FIGS. 3 and 4, for the sake of simplicity, only two transport tracks $t_1$ and $t_2$ are shown.

The sequence of the single sheets, $B_n$, and their various sizes depend on the print job to be performed (i.e., number of copies and size of each original image, $V_n$). The job data is fed to the computer 300. On the basis of this data, under the control of the computer 300, the paper cassette 121 or 122 that has the proper paper width is then selected for each paper copy to be made. Through the use of the pair of discharge rollers 136 associated with the paper cassette and the paper cutter 138, a sheet $B_n$, of the requisite length is pulled out and cut off. The cut sheet is fed onto the buffer stage 131, advanced by its leading edge up to a defined starting position "x". The sheet, $B_n$, is then transferred to the conveyor belts 113 of the paper stage 110 and transported at a constant speed (e.g., 25 mm/second) underneath the line exposure unit 140 to the paper processor which takes control of the sheets with their order and mutual disposition unchanged. As the sheets are being transported under the line exposure unit 140, the sheets are written on in a line-by-line fashion. The line exposure unit 140 performs 250 scans per second, which at the aforementioned transport speed of about 25 mm per second, results in a printing resolution in the transport direction of 250 dpi (pixels per inch).

In the exemplary embodiment shown, the buffer stage 131 is equipped with two independently driven conveyor belts 134a and 134b. This allows advancement of the sheets in a manner that is uncoupled with the transport on the paper stage 110 and that can be done at various speeds, depending on whether the sheets have just been taken over from the discharge rollers 136 (high speed) or deposited onto the paper stage 110 (comparatively low speed, synchronized with transport on the paper stage). It is understood that for wider stages, a higher number of independent drive mechanisms for the sheets in the buffer stage can be provided.

The distribution of the various sheets (i.e., prints), $B_n$, to the various transport tracks of the paper stage 110 can be achieved by employing various strategies. In general, the goal will be to select as compact an arrangement as possible of single sheets, so as to make optimal use of the space available and, therefore, maximize the throughput the printer. The next sheet will thus always be placed in the same transport track where the most space is available at that moment. In other words, a sheet will be placed where the sheet preceding it in the track is already advanced the farthest. For example, in FIG. 3, sheet No. 4 would not be placed in track $t_1$, behind the sheet No. 3. Rather, sheet No. 4 would be placed in track, $t_2$, behind sheet No. 2. The arrangement can also made such that the leading edges of the successive sheets, in the order in which they entered, are each spaced apart by at least a system-dictated sorting distance. Similar considerations apply for an alignment with the likewise conventional sorting by the trailing edges of the single sheets. The distribution of the single prints transversely among the various transport tracks is effected by a corresponding crosswise adjustment of the paper cassette or paper cassettes 121 and 122. The distribution and positioning of the sheets on the paper stage 130 is controlled by the computer 300. Thus, the computer is informed at all times of where a given sheet is at that particular moment. In particular, it is known to the computer which sheet or sheets are located in which longitudinal position relative to the longitudinal position of the exposure line "z".

In the exemplary embodiment shown, the transverse distribution of the various sheets are shown for the sake of simplicity by corresponding crosswise adjustment of the paper cassettes. However, a transverse distributor can also be used for this purpose. The crosswise distributor will be supplied with single sheets from the paper cassettes, which would be stationary. The crosswise distributor moves the individual sheets into the desired transverse position by means of a suitable transport mechanism, typically conveyor belts, and then feeds the sheets onward into the appropriate transport track of the buffer stage.

In FIG. 3, sheet No. 5 was pulled from the paper cassette 121, cut to the proper length, transferred to the buffer stage 131, and transported at high speed to the starting position "x". Sheet No. 4, as shown in FIG. 3, is being transferred to the paper stage. Sheets No. 3 and No. 2 are being exposed to light, and sheet No. 1 is leaving the paper stage in the direction of the downstream paper processor. Once a print has reached the starting position "x", it is transferred onto the paper stage in synchronism with the transport of the stage. Since the distance between the starting position "x" and the position of the exposure line "z" is predetermined, the chronological offset described above automatically ensues, given a constant transport speed on the paper stage. The computer 300 can determine when the leading edge of the sheet will reach the exposure line and the exposure of that sheet will begin.

The recording of the picture information onto the individual sheets takes place in successive partial recording steps, in which a single image line is scanned at a time. More specifically, a strip-like partial image region having the length, measured in the transport direction of the sheets, of a single pixel. As FIGS. 2–4 show, depending on the distribution and arrangement of single sheets on the various transport tracks, two or more sheets can be exposed to light simultaneously. This requires a specialized organization of the exposure data, which will explained in conjunction with FIG. 4, taking the simple example of two adjacent sheets to be exposed to light simultaneously.

The exposure data for the individual paper copies to be made is stored, as noted above, in the picture information memory S of the computer 300 in the form of a linear lineup of matrices with three planes. The dimensions of the matrices correspond to the desired resolution of the copies to be made, so that in the final analysis each dot on the matrix is equivalent to one pixel of the paper copy to be produced.

The exposure data of the picture line currently to be exposed to light, which may encompass more than one sheet of variable image content, is stored in a line memory "ZS". The length of the line memory "ZS" is defined by the total number of pixels that the line exposure unit 140 can record in one scan (e.g., 2400 to 3600). For color copies, three such line memories "ZS" are provided, which draw their data each from one of the three planes of the picture information memory S. For the sake of simplicity, however, only one such line memory "ZS" is shown in FIG. 4. The content of the line memory or line memories "ZS" is composed of the picture data of two pictures. In the exemplary embodiment shown in FIG. 4, these are the pictures No. 4 and No. 5. The data of the line memory "ZS" that does not belong to locations (e.g., intermediate spaces) in the exposure line "z" that are covered by copy paper sheets, are advantageously set to zero (i.e., black).

Once a sheet has been positioned in the starting position "x", a counter associated with that sheet is set to a value that corresponds in units of sheet advancement between two scans to the known distance between the starting position "x" and the position of the exposure line "z". For a distance of 250 mm and an advancement of 0.1 mm per scan corresponding to 250 dpi, the starting value would accordingly be 2500. The counter is then decremented at the pace of the scan. Once the counter reaches the value 0, the applicable sheet is located one increment upstream of the exposure position. Now the first data line of picture No. 5 is transferred from the picture information memory S to the line memory "ZS", and in the next scan these data are projected onto the associated sheet, which is then located in the exposure position. For the ensuing scans, the exposure data of picture No. 5 are transferred line by line from the memory S to the line memory "ZS", and data are projected onto the associated sheet until such time as there are still data in the memory for that picture.

Since the sheet onto which the exposure data of picture No. 5 are to be projected has been placed in what is the upper half, transport track $t_1$, of the paper path, the data is written into the upper half $zs_1$ of the line memory "ZS". The starting address (i.e., the association between transport tracks and regions of the line memory) can be ascertained through setup testing.

Similar to the procedure described in conjunction with picture No. 5, the exposure data of picture No. 4, under the control of a counter assigned to the picture, is written into the $zs_2$ of the line memory and projected onto the associated sheet. Before the data is copied into the line memory, this memory is initialized each time by 0 (i.e., black), so that intermediate spaces on the sheets, and so forth, are not exposed to light. For all the other pictures, the procedure is logically the same.

This invention has been described above in terms of a photographic minilab which is equipped with a recording device in the form of a line exposure unit operating line by line. However, as already noted earlier, the invention is understood not to be limited to line exposure units or to line by line processing. For instance, by means of suitable recording devices, it is entirely possible for wider striplike subregions, extending crosswise over the entire recording width of the recording station, to be exposed to picture information. Moreover, the single sheets need not necessarily be moved continuously during the individual partial recording steps. On the contrary, it is also possible to move the sheets intermittently, or in other words to stop them for each partial recording step. Furthermore, it is also possible either not to expose the single sheets over their full surface area, so as to create an unexposed edge, or to expose the sheets somewhat beyond their edges, in order to compensate for slight tolerances in positioning.

This invention is also not limited to the photographic exposure of picture information by means of a scanning line exposure unit. Photographic projection is for instance also possible by means of one or two-dimensional arrangements of light-emitting elements or by means of a cathode ray tube. Nor is this invention limited to photographic methods. For instance, the recording of picture information can also be done by means of ink jet, bubble jet, solid ink, thermotransfer, and thermosublimation methods, and even dot matrix printers, can be operated by the method of the invention.

Finally, the invention is not limited to the recording of picture information originating in a film scanner. It is for instance also possible, as the picture information to be recorded, to use picture data originating from other sources, for instance other scanners, or graphic data on graphics generated by computers, and so forth. The recording apparatus according to the invention may also be embodied and used as a photocopier. The picture information may also be furnished to the computer 300 by means of an arbitrary data carrier medium, as long as the recorder is designed to read that medium. Hence, the recording apparatus according to the invention can also be embodied as an image output device for a computer, where the term "image" should be understood in its broadest sense, or in other words includes any optical information.

It will be appreciated by those skilled in the art that the present invention can be embodied in other specific forms without departing from the spirit or essential characteristics thereof. The presently disclosed embodiments are therefore considered in all respects illustrative and not restricted. The scope of the invention is indicated by the appended claims rather than the foregoing description and all changes that come within the meaning and range and equivalence thereof are intended to be embraced within.

What is claimed is:

1. A method for recording picture information onto sheets of recording material wherein picture information to be recorded for each sheet of said recording material is present in electronically stored pixel form, said method comprising:

transporting said sheets of recording material through a recording station on at least two adjacent tracks;

recording stored picture information belonging to each respective sheet of said recording material onto each respective sheet located on the adjacent tracks, in a pixel-by-pixel manner; and distributing said sheets crosswise to a transport direction of said sheets on said at least two adjacent tracks, depending upon a width of said sheets and upon distribution of said sheets such that said sheets are not overlapping in said direction crosswise to said transport direction, wherein said width of said sheets is measured crosswise to said transport direction.

2. The method of claim 1, wherein said recording stored picture information is effected in successive partial recording steps, each said partial recording step comprising:

recording the picture information belonging to strip-like subregions of the sheets onto the sheets located in the adjacent tracks, wherein said strip-like subregions are of substantially equal width, measured crosswise to a transport direction of the sheets, and wherein said subregions have a length, measured in the transport direction of the sheets, of at least one pixel.

3. The method of claim 2, wherein the sheets located in the adjacent tracks in the recording station are transported onward by the length of said subregions either after the partial recording steps or during them.

4. The method of claim 3, wherein said subregions of the sheets each with a length measured in the transport direction, of a single pixel are recorded, and the subregions extend in a straight line.

5. The method of claim 2, wherein the recording of the picture information onto the stripe-like subregions of the sheets located in the recording station in the adjacent tracks is effected simultaneously or sequentially.

6. The method of claim 1, wherein the sheet-like recording material is photographic material, and that the recording is effected by exposing the sheets to light.

7. The method of claim 6, comprising producing photographic copies of originals, further comprising the steps of;

photoelectrically scanning said originals to obtain scanning values for each pixel of said originals;

calculating exposure data and storing said data in memory, said exposure data being a digital representation of the copies to be made; and projecting the stored exposure data as picture information onto the single sheets of photographic recording material.

8. The method of claim 1, wherein said sheets of the photographic recording material are distributed to the tracks in such a way that unoccupied empty space next to and between the single sheets is minimized.

9. An apparatus for recording picture information onto recording material in the form of single sheets, having a recording station in which the picture information is recorded onto the sheets, comprising:

a transport system for transporting the sheets through said recording station having at least two adjacent tracks and a distributor device for distributed disposition of the sheets on said tracks;

a picture information memory, in which the picture information recorded onto the sheets is present, stored electronically pixel by pixel for each individual sheet;

a recording device which is located in the recording station and reads out the picture information from the picture information memory and records it onto the sheets of the recording material; and a sheet distributing device for distributing said sheets on at least two tracks, said sheet distributing device varying a distribution position of said sheets crosswise to a transport direction of said sheets depending on a width of the sheets, said width being measured crosswise to said transport direction, wherein said recording device reads out the stored picture information from the picture information memory corresponding to an order of sheets in the tracks, and acts upon sheets located in the recording station in the adjacent tracks with the read-out picture information.

10. The apparatus of claim 9, wherein said recording device records the picture information in sequential partial recording steps onto the sheets in strip-like subregions of the sheets, said strip-like subregions being substantially of equal width, measured crosswise to a transport direction of the sheets, to said sheets, said subregions having a length measured in a transport direction of the sheets that is at least equal to one pixel, and wherein the recording device in each partial recording step records the picture information, onto the applicable sheets.

11. The apparatus of claim 10, wherein said transport system transports the sheets located in the adjacent tracks in the recording station onward by the length of the subregions after initiation of the partial recording steps.

12. The apparatus of claim 9, wherein said distributor device distributes the sheets of the recording material to the tracks of the transport system so that unoccupied empty space next to and between the individual sheets is minimized.

13. The apparatus of claim 9, further comprising a scanner device for photoelectric scanning of originals in a pixel-by-pixel manner; and picture information computer which calculates picture information data in a pixel-by-pixel manner for each original and stores them in the picture information memory as a digital representation of copies to be made from the originals.

14. The apparatus of claim 9, wherein said recording device is a laser exposure device that operates in a line-by-line fashion.

15. The apparatus of claim 9, wherein said recording device is at least one of a cathode ray tube exposure device and an exposure device with a field of light-emitting elements.

16. The apparatus of claim 9, wherein said recording device is one of an ink jet, bubble jet, thermosublimation and thermotransfer printer.

* * * * *